(No Model.) 7 Sheets—Sheet 1.

W. C. RAND.
MECHANISM FOR COVERING STRAPS.

No. 594,181. Patented Nov. 23, 1897.

(No Model.) 7 Sheets—Sheet 3.

W. C. RAND.
MECHANISM FOR COVERING STRAPS.

No. 594,181. Patented Nov. 23, 1897.

Fig. 3.

Witnesses.
Fred S. Greenleaf.
Thomas J. Drummond.

Inventor.
William C. Rand.
By Crosby & Gregory.
Attys.

(No Model.) 7 Sheets—Sheet 5.

W. C. RAND.
MECHANISM FOR COVERING STRAPS.

No. 594,181. Patented Nov. 23, 1897.

Witnesses.
Fred S. Greenleaf.
Thomas J. Drummond.

Inventors.
William C. Rand.
By Crosby & Gregory.
attys.

(No Model.) 7 Sheets—Sheet 6.

W. C. RAND.
MECHANISM FOR COVERING STRAPS.

No. 594,181. Patented Nov. 23, 1897.

Witnesses.
Fred L. Gunluf
Thomas J. Drummond

Inventors.
William C. Rand.
By Crosby & Gregory
Attys.

UNITED STATES PATENT OFFICE.

WILLIAM C. RAND, OF LEWISTON, MAINE, ASSIGNOR TO VERTRUDE P. BUCK, OF AUBURN, MAINE, AND HARRY W. SPENCER, OF BOSTON, MASSACHUSETTS.

MECHANISM FOR COVERING STRAPS.

SPECIFICATION forming part of Letters Patent No. 594,181, dated November 23, 1897.

Application filed May 13, 1896. Serial No. 591,365. (No model.)

*To all whom it may concern:*

Be it known that I, WILLIAM C. RAND, of Lewiston, county of Androscoggin, and State of Maine, have invented an Improvement in Mechanism for Covering Straps, of which the following description, in connection with the accompanying drawings, is a specification, like letters on the drawings representing like parts.

This invention has for its object the production of a novel apparatus for covering straps to be used chiefly in the manufacture of boots and shoes to thereby obviate soiling such straps during the handling necessary in the manufacture of the boots or shoes.

Prior to my invention it has been customary to cover webbing or straps with paper, the latter being used in the form of a long strip and lapped about the webbing by means of a binder; but this method of covering requires mechanism for feeding the paper and webbing peculiarly, so that the entire length of webbing will not be covered by the paper. I have devised a machine wherein the webbing is fed by suitable feeding mechanism under a "former," and the paper, acted upon by feeding mechanism, is fed at right angles to the direction of movement of the webbing and under it and the former, and is cut off, leaving a cover-piece, to a portion of which paste is applied, after which suitably-actuated folding-blades act to pull the cover-piece around the web and the former, pressing the overlapped edge of the cover-piece down and making thereby a flattened tube inclosing the webbing and the former. The feed mechanism for the webbing operates intermittingly and is moved at each operation to feed enough webbing for a boot or shoe strap, the webbing remaining stationary while the cover-piece is being applied thereto, said webbing being clamped under the former at such time. The cover-piece having been applied, the former will preferably be raised to unclamp the webbing and thereafter preferably move a short distance in the direction of its length to feed the end of the paper cover on it and surrounding the webbing into position to be acted upon by the webbing-feeding mechanism, so that the tubular cover and webbing will be drawn away from the end of the former. The covered webbing is fed in a suitable guideway for a sufficient distance to place the middle of the length of the boot-strap over a pair of folding-rolls, whereupon a folding-plate is moved to act on the unsupported side of the covered part of the webbing, and the webbing having been cut off to the desired length the folding-plate folds the covered length of strap centrally and it is discharged from between the folding-rolls covered and folded upon itself ready for use.

The under side of the former is shown as convexed to thus bend the webbing slightly in the direction of its width, as I find that the webbing so bent when covered by a tubular envelop and fed from the former will in resuming its flat position, as it does while being passed between the feeding-rolls, fill the flat tubular cover from edge to edge. A gage mechanism having fingers or feelers is arranged in the guideway in which the covered strap is folded, and said fingers or feelers act against the ends of the cover to position the same centrally over the folding-rolls to thus insure even folding of the covering with the strap.

I have herein shown a simple form of printing mechanism, in connection with the apparatus, to print the webbing before covering the same, the covering when removed displaying the name of the manufacturer or other suitable matter printed upon the strap.

Fig. 2 is a rear elevation of the apparatus shown in Fig. 1 with the parts in the same position. Fig. 2ª is a side view of the cam shown in Fig. 2, to be described. Fig. 7 is an enlarged vertical sectional view taken on the line $x'\ x'$, Fig. 5.

Figure 1:
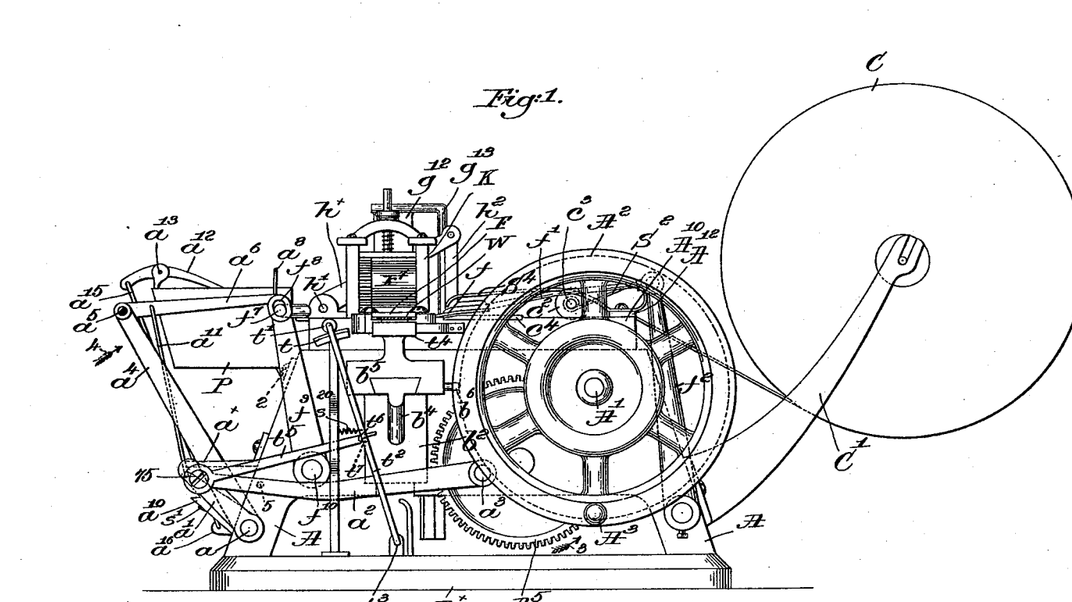
Figure 1 is a front elevation of an apparatus embodying my invention with the parts in position to release and remove a covered strap.
Figures 2, 2A:
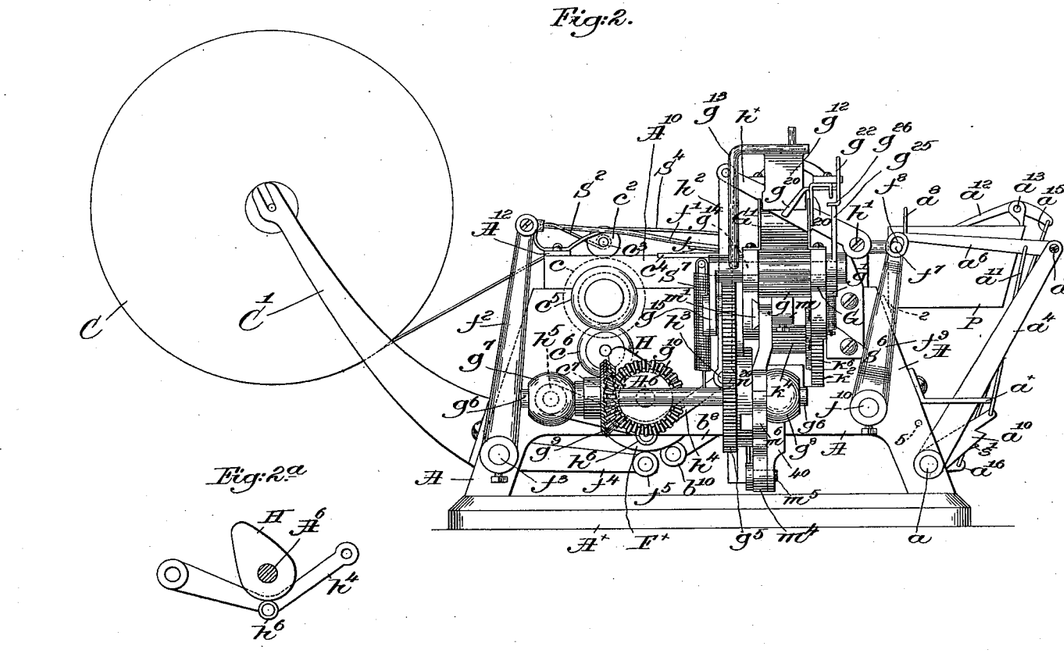
Figure 3:
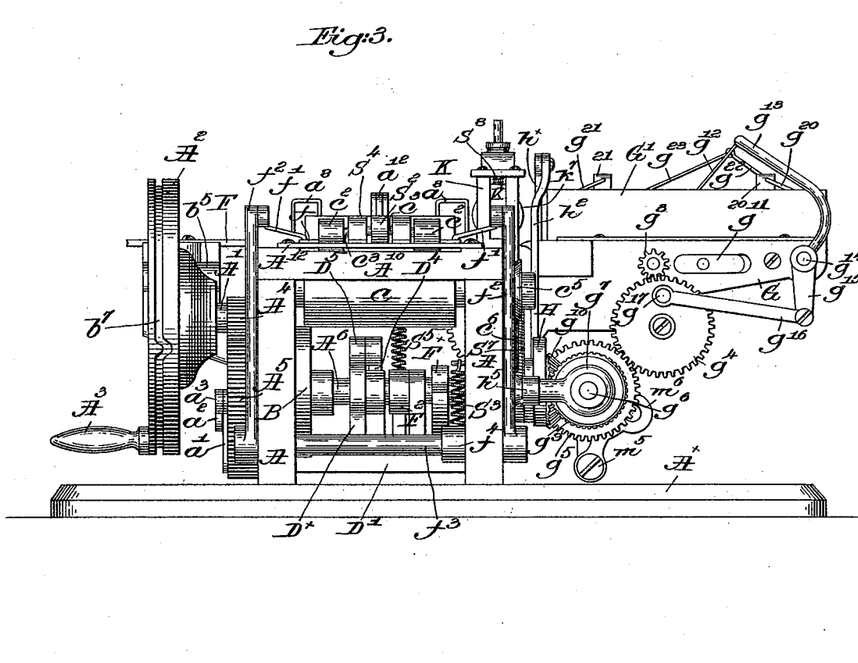
Fig. 3 is a right-hand end view of the apparatus.

The frame A, of suitable shape to provide bearings for the operative parts of the apparatus, is shown as mounted on a rigid base $A^\times$, said frame having attached thereto a stud $A'$ on which is rotatably mounted a driving or balance wheel $A^2$, which may be rotated in any suitable manner, either by power or by a handle, as $A^3$, said balance-wheel having secured thereto a pinion $A^4$, in mesh with a gear $A^5$, fast on a shaft $A^6$, mounted in bearings in the frame and having secured thereto a series of cams for operating the various mechanisms. At the opposite left-hand side of the frame, viewing Fig. 1, is mounted a rock-shaft $a$, to which is secured an arm $a'$, pivotally connected by a link $a^2$ to a wrist pin or stud $a^3$ on the gear $A^5$, said rock-shaft having loosely mounted thereon like rocker-arms $a^4$, located, respectively, at each side of a paste-vat P, secured to the frame in suitable manner, as by screws 2. The rocker-arms have pivoted thereto at $a^5$ levers $a^6$, to the inner ends of which is attached a paster (shown as a wire $a^7$) bent over and downward at each side, as at $a^8$, over the side of the paste-vat P to cause the main part of the paster $a^7$ to at times descend partially within the vat. Like hubs $a^9$ (best shown in Fig. 4) are secured to the rock-shaft $a$ within the frame, each hub having secured to or forming part of it an arm $a^{10}$, suitably connected by a link $a^{11}$ to the lever $a^6$ on the same side of the paste-vat, the said arms $a^{10}$ in the rocking of the shaft by rotation of the gear $A^5$ in the direction of the arrow 3, Fig. 1, first acting to lift the paster out of the vat from the position shown in the drawings and to thereafter depress the paste onto a portion of the paper cover, the forward movement of the paster from the vat to paste-applying position being effected by the swinging movement of the lever-arms $a^4$ in the direction of the arrow 4, as will now be described. Stops $a^\times$ on the frame in the paths of outward movement of said rocker-arms limit their movement when they have assumed the position shown in Fig. 1, and suitable lugs or projections 5 (see dotted lines, Figs. 1 and 2, and full lines, Fig. 6) limit the inward movement of the rocker-arms.

Figure 4:
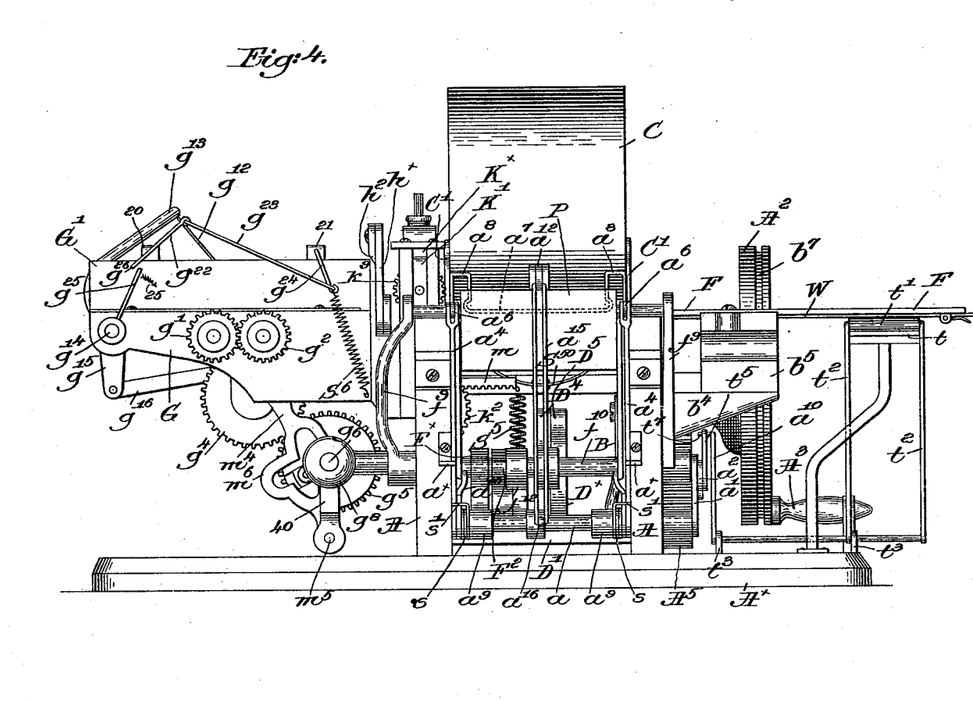
Fig. 4 is a left-hand elevation viewing Fig. 1.
Figure 5:
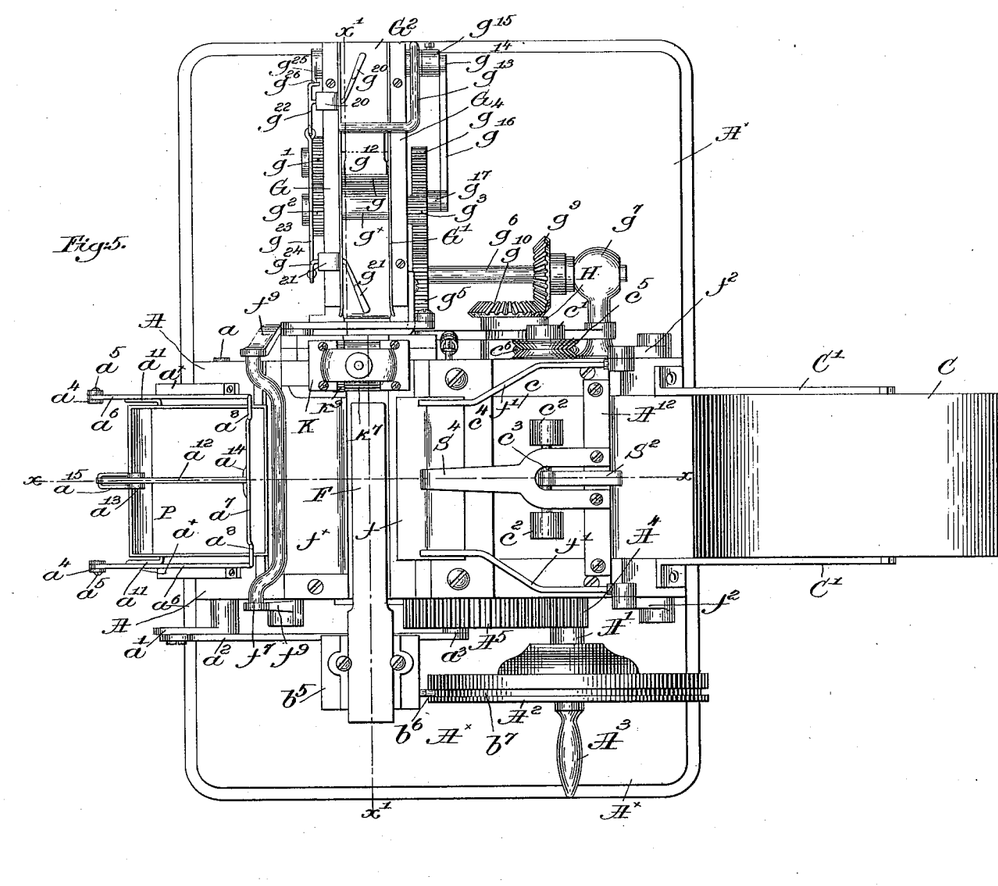
Fig. 5 is a top or plan view of the apparatus.
Figure 6:
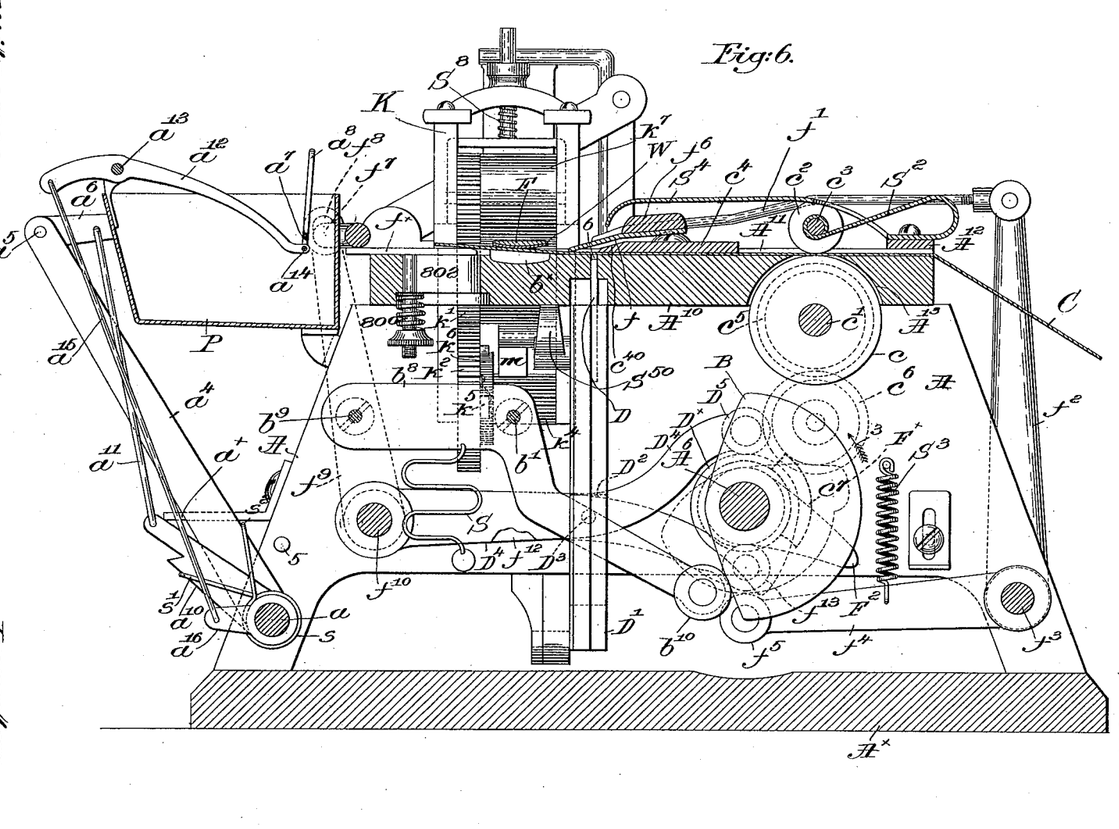
Fig. 6 is an enlarged vertical sectional view taken on the line $x\ x$, Fig. 5, the roll of paper being omitted.
Figure 8:
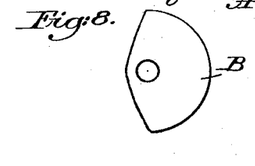
Figs 8, 9, 10, and 11 are side views, respectively, of the cams on the cam-shaft, to be described.
Figure 9:
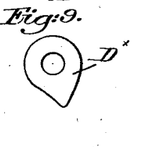
Figure 10:
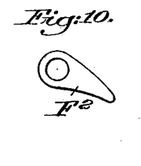
Figure 11:
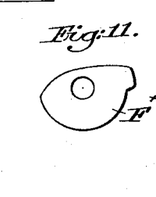

Springs $s$ are wound about the hubs $a^9$, and the ends of the springs are turned outwardly, as at $s'$ $s^2$, Fig. 6, to extend beyond the arms $a^{10}$ of the hubs and into the paths of movement of the arms $a^4$, Fig. 4, so that the ends $s'$ of the springs will bear against the rocker-arms $a^4$ and move them inward until they engage the stops 5, whereupon the arms $a^{10}$ continue their movement, the spring-arms expanding to effect the depression of the paster upon the paper. In the reverse movement of the rock-shaft the ends $s^2$ of the springs act upon the inner sides of the rocker-arms $a^4$ and carry them outward until they abut against the stops $a^\times$, the arms $a^{10}$ continuing the outward movement sufficiently to depress the paster $a^7$ into paste-receiving position.

A lever $a^{12}$, fulcrumed at $a^{13}$ on the outer wall of the paste-vat, as herein shown, has secured to its inner end a transverse paste-lifter $a^{14}$, shown as a rod preferably grooved on its upper side to receive a portion of the paste or other adhesive within the vat P and to transfer it to the under side of the paster $a^7$, the "paste-transferrer" $a^{14}$, as it may be termed, moving up and down the vat.

The necessary rising-and-falling movement of the paste-transferrer is effected by means of a link $a^{15}$, pivotally connected at its upper end to the outer arm of the lever $a^{12}$ and at its lower end to a rocker-arm $a^{16}$, fast on the rock-shaft $a$. The frame A at one side, herein shown the side adjacent the gear $a^5$, is slotted at $b$, Fig. 7, to receive a headed stud $b'$, to the outer end of which is secured a slide-block $b^2$, vertically movable in a recessed guideway $b^3$ in the outer side of the frame, said slide-block having secured to or forming part of it a horizontally-extended arm $b^4$, shaped at its top to enter a preferably undercut groove in a carrier $b^5$, to which is rigidly secured the outer end of the former F, preferably downwardly convexed at its under side and extended across the top of the frame. The carrier is provided with a suitable roller or other stud $b^6$ to enter a cam-groove $b^7$, herein shown in the periphery of the balance-wheel $A^2$, to reciprocate the former longitudinally at the proper time to carry the end of the covered strap or webbing into position to be engaged by the feeding mechanism for said webbing.

The top of the frame is recessed at $b^\times$ (see Fig. 6) beneath the former to allow the latter to be pressed therein at certain times, the vertical reciprocation of the former being effected by means of a lever $b^8$, (see Fig. 6 and 7,) fulcrumed on the inside of the frame at $b^9$, and through which the stud $b'$ is extended, said lever having preferably a roll $b^{10}$, held by a spring S in engagement with the periphery of a cam B, fast in the cam-shaft $A^6$.

The webbing W to be covered (shown in Figs. 1, 6, and 7) and from which the boot or shoe straps are to be severed in proper lengths is introduced from any suitable source of supply beneath the outer end of the former F and between it and a spring $S'$, secured thereto and adapted to enter a recessed part $b^{12}$ of the carrier $b^5$, and is drawn beneath the former, in starting the machine, to the inner end thereof.

I have herein shown in Figs. 1, 2, 4, and 5 a roll C of paper of suitable width to form the cover for the straps, said roll having its journal supported in brackets $C'$, secured to the frame at the side opposite the paste-vat, the strip of paper being led over the top or bed plate $A^{10}$ of the frame in a suitable recess $A^{11}$, extending to the transverse depression $b^\times$ and beneath a guide-plate $A^{12}$. The bed-plate is cut away transversely at $A^{13}$ to expose the periphery of an intermittingly-operated feed-roll $c$ on a shaft $c'$, journaled in the frame, a coöperating presser-roll $c^2$, herein shown in two parts mounted loosely on a stud $c^3$, being held pressed toward the roll $c^2$ by a suitable spring $S^2$, the strip of paper being nipped between the rolls $c\ c^2$ and fed forward intermittingly beneath a cover-plate $c^4$, which also forms a guide or support for one of the folding-blades, to be described.

The shaft $c'$ of the feed-roll $c$ has secured thereto a preferably-grooved wheel $c^5$ in engagement with a friction-wheel $c^6$, having a convexed periphery, preferably of rubber or other suitable yielding material, said friction-wheel $c^6$ being engaged at times by a grooved segment $c^7$, fast on the inner end of the cam-shaft $A^6$, to thereby rotate the feed-roll intermittingly.

The length of the feed-segment $c^7$ is such that the feed-roll $c^6$ will be rotated sufficiently at each operation to move forward a length of the paper sufficient to form the tubular cover for the web, the paper-feeding mechanism operating while the former is raised, so that the feeding end of the strip will be carried beneath the former and the webbing and above one of the folding-blades.

The folding-blades $f$ and $f^\times$ are located at opposite sides of the former and are independently movable toward and from each other in the operation of the apparatus, the blade $f$ being pivotally attached by arms $f'$ to the upper side of rocker-arms $f^2$, fast on a rock-shaft $f^3$, mounted in bearings in the lower part of the frame at the end nearest the paper-roll, said shaft $f^3$ having secured to it a third arm $f^4$, provided with a roller or other stud $f^5$, (see Fig. 6,) held by a spring $S^3$ against the periphery of a cam $F^\times$ on the cam-shaft, the said folding-blade normally resting upon the guide $c^4$, the transverse edge of which nearest the former is beveled at $c^{40}$, (see Fig. 6,) a spring $S^4$ being adapted to engage a lug or projection $f^6$ on the blade $f$ when the latter is moved forward toward the former to thereby press the blade firmly upon the paper.

The paper is fed forward beneath the former and the webbing. The former is depressed, carrying the web and paper into the depression $b^\times$, and at the same time paper sufficient to form the tube or cover is severed from the main strip by a cutter, (shown as a blade D,) vertically movable in front of the cover-plate or paper-guide $c^4$. When the paper is severed by the cutter, the ends of the severed portion are lifted by depression of the former F, and then the movement of the blade $f$ is accomplished, the said blade engaging the under side of the paper nearest thereto and folding it over and down upon the top of the former. This having been accomplished, the coöperating and oppositely-moving folding-blade $f^\times$ is moved forward to fold the other ply of the cover down upon the first folded ply, the second ply of the cover, which is acted upon by the blade $f^\times$, having had a portion of paste applied to its uppermost side by the paster $A^7$, as it rested upon the top of the blade $f^\times$, by the pasting mechanism hereinbefore described. As the second ply is folded over upon the first by the movement of the blade $f^\times$ over the former, the blade $f$ is withdrawn and when both folding-blades have been withdrawn from the path of the former the latter is lifted, as has been described, and moved longitudinally toward the webbing-feeding mechanism, carrying with it and around it the tubular covering surrounding the webbing and the former.

The folding-blade $f^\times$ reciprocates horizontally in a guide grooved in the top of the bed-plate $A^{10}$ and is held in place by a spring-controlled stud 800 in a slot 802 and has outwardly-extended journals $f^7$, which enter slots $f^8$ in the upper ends of rocker-arms $f^9$, fast on a rock-shaft $f^{10}$, mounted in the frame and having secured to it a third arm $f^{12}$, provided with a roller or other stud $f^{13}$ (see Fig. 6) in the path of and to be acted upon by a cam $F^2$, fast on the shaft $A^6$, a spring $S^5$ holding the roll in position to be acted upon by the cam. The paper-cutting blade D is rigidly secured to the upper portion of a knife-carrier $D'$, vertically reciprocable in vertical guideways in the inner sides of the main frame, the said knife-carrier having a yoke $D^2$, connected by a pivot $D^3$ to an arm $D^4$, loosely fulcrumed on the rock-shaft $f^{10}$ and provided at its free end with a roller or other stud $D^5$ to be acted upon by a cam $D^\times$ on the cam-shaft $A^6$, a spring $S^{50}$ depressing the carrier $D'$.

The bed-plate $A^{10}$ is transversely slotted at 6 just in front of the beveled edge $c^{40}$ of the plate $c^4$ to receive the paper-cutting blade D. The main frame at its rear side has secured thereto horizontally-extended brackets G, upon which is supported a trough-like guide $G'$, open at its ends and top, and having its bottom $G^2$ cut out to expose the peripheries of two suitable folding and discharging rolls $g\ g^\times$, which are journaled in the brackets G and positively connected by intermeshing gears $g'\ g^2$, as shown in Fig. 4, one of the rolls, as $g^\times$, having secured to its journal at the opposite end a pinion $g^3$, in mesh with a gear $g^4$, mounted on a stud on one of the brackets G, said gear $g^4$ in turn meshing with a gear $g^5$ on a shaft $g^6$, supported in bearings $g^7\ g^8$, Figs. 5 and 4, suitably attached to the frame, the shaft $g^6$ having fast thereon a beveled gear $g^9$, in mesh with a like gear $g^{10}$, fast on the outer end of the main cam-shaft $A^6$, rotation of the said cam-shaft by means of the intermediate gearing rotating the folding and discharging rolls $g$ and $g^\times$. One of the rolls, as $g$, is shown as mounted in adjustable bearings $g^{11}$, so that it may be moved toward and from its coöperating roll to regulate the distance between them.

A thin blade or finger $g^{12}$ is secured to a rocking arm $g^{13}$, fast on a rock-shaft $g^{14}$, mounted in the brackets G, said rock-shaft having secured thereto a rocker-arm $g^{15}$, pivotally connected by a link $g^{16}$ to a wrist-pin $g^{17}$ on the gear $g^4$, rotation of the latter rocking the shaft $g^{14}$ to move the blade $g^{12}$ into the trough-like guide G' and toward and from the bite of the rolls $g$ and $g^\times$ to thereby engage the covered strap, then in the guide-trough, and to bend the same outward to enable the rolls $g$ $g^\times$ to nip or engage and fold the covered strap over upon itself and to discharge it from the machine covered and folded upon itself.

I have provided gage mechanism coöperating with the trough-like guide to act against the ends of and position the paper cover centrally over the folding rolls to insure even folding of the covering with the strap, said gage mechanism, as herein shown, consisting of two fingers $g^{20}$ $g^{21}$, pivoted in ears 20 and 21, respectively, on the guide, the finger $g^{20}$ having secured to its outer end an arm $g^{22}$, connected by a link $g^{23}$ to the downturned outer end or arm $g^{24}$ of the finger $g^{21}$, a spring normally maintaining the fingers and their connections in the position best shown in Figs. 4 and 7.

A trip $g^{25}$ on the rock-shaft $g^{14}$ swings through an arc across which is extended the inturned lower extremity $g^{26}$ of the arm $g^{22}$, so that when the trip $g^{25}$ is moving in the direction of the arrow 25, Fig. 4, it will first engage the inturned extremity $g^{26}$ of the rocker-arm $g^{22}$ and will turn the same thereby and by means of the intermediate connections described will swing the fingers $g^{20}$ and $g^{21}$ in the direction of the arrows, Fig. 7, toward each other to engage the ends of the tube T, Fig. 7, surrounding the webbing, to move the tube relatively to the folding and discharging rolls $g$ $g^\times$, so that said cover will be folded centrally when acted upon by the blade $g^{12}$. Further movement of the trip carries it out of engagement with the end $g^{26}$ of the rocker-arm, releasing the fingers, which are immediately returned to normal position by the spring $S^6$, said spring yielding to permit the passage of the trip in its return to starting position.

The covered portion of the webbing is not severed from the main portion until the cover has been positioned, the severing being accomplished, as herein shown, by fixed and movable cutting-blades $h$ $h^\times$, the fixed blade being suitably secured to the frame at the outer side of the web-feeding rolls, to be described. The movable blade $h^\times$ is fulcrumed at one end, as at $h'$, Fig. 2, and pivotally connected at its other end to a link $h^2$, the lower end of the link being pivoted at $h^3$ to a bent lever $h^4$, fulcrumed at $h^5$ on the frame and carrying a roll $h^6$, to be acted upon by the cam H on the cam-shaft $A^6$, inside the bevel-gear $g^{10}$, a spring $S^7$ holding the roll against the face of the cam. The movable blade $h^\times$ is thus reciprocated in a vertical plane at right angles to and across the path of the webbing to sever the same at predetermined intervals.

The rear side of the main frame is cut out to receive a stand K, having journaled therein a lower webbing-feed roll $k$, provided with a gear $k'$, in mesh with a large gear $k^2$, loose on a shaft $k^3$, mounted in the lower part of the stand and having a pinion $k^4$ fast thereon, in mesh with a rack $m$. (See Fig. 7.) The gear $k^2$ has upon its side, as best shown in Fig. 7 in dotted lines, one or more spring-pawls $k^5$, to coöperate with a ratchet-wheel $k^6$, fast on the shaft $k^3$, so that when the rack $m$ is moved in the direction of the arrow 30, Fig. 7, the large gear $k^2$ will be positively rotated, it in turn transmitting rotative feeding movement to the roll $k$ in the direction of the arrow 31. On the outward throw of the rack the pawls will slip over the ratchet-wheel $k^6$ and the webbing-feeding mechanism will remain at rest.

An upper feed-roll $k^7$ is journaled in a carrier K', said carrier being vertically movable in slots $K^\times$ in the stand and being depressed by a spring $S^8$, Fig. 6, to press the upper roll $k^7$ upon the lower roll $k$ to nip the webbing between them, a gear $k^9$, fast on the roll $k^7$, meshing with the gear $k'$ of the lower roll $k$. A slide-block $m'$ is provided with a stud $m^2$, extended through a hole in the upturned outer end of the rack-bar $m$, said slide-block moving in a guideway or groove $m^\times$ on the inner side of one of the brackets G, the said stud extending through a longitudinal slot $m^3$ in the upper end of an arm $m^4$, pivoted at $m^5$ on a hanger 40, depending from the bearing $g^8$, the arm being held between the block $m'$ and the end of the rack-bar $m$. The arm $m^4$ is enlarged to form a peculiar internal cam $m^6$, said cam having a face $m^7$, against which a roller or other stud $n$, radially adjustable in a slotted disk $n^{20}$ on the face of the gear $g^5$, bears to move the rack-bar $m$ outwardly, a face $m^8$, which is engaged by the stud to move the rack-bar inwardly, and slotted portions $m^9$ $m^{10}$ on an arc whose center is the fulcrum $m^5$ to permit the passage of the shaft $g^6$ through the cam without interfering with its movement. The oppositely-located faces $m^7$ $m^8$ are, as is clearly shown in Fig. 7, parts of recessed portions of the cam $m^6$, the roll or other stud $n$ moving from the face $m^7$ across the intervening space and causing thereby a slight dwell of the rack-bar, then engaging the face $m^8$ to move the rack-bar $m$ inward, and again having a slight dwell as it is passed back to the face $m^7$.

The various mechanisms may be so arranged and timed as to their operation that when the former is raised and moved longitudinally toward the webbing-feeding rolls $k$ $k^7$ to present the end of the webbing thereto the said rolls will be brought into operation to draw the webbing and its tubular cover of paper forward between them and into the trough-like guide G', the feeding movement of the rolls ceasing when the gage-fingers operate to position the cover centrally over the folding and discharging rolls $g$ $g^\times$. The webbing-severing mechanism then operates to sever the desired length of strap and the folding-blade $g^{12}$ acts upon the unsupported side of the severed piece of webbing to press it down, so that it and its cover may be caught between the discharging-rolls, the strap and its cover being folded as they pass therethrough.

My invention is not restricted to the precise construction or arrangement of parts herein shown, as the same may be modified in various particulars without departing from the spirit and scope of my invention.

The straps usually have printed upon them the name of the manufacturer of the boots or shoes to which they are secured, a trademark, or other information, and I have shown only in Figs. 1 and 4 very simple printing mechanism for printing the desired matter upon the webbing before it is covered. An ink-supplying pad or ink-holder $t$ is secured to the main frame at one side of the former, and an inking-roller $t'$ is mounted on vibratable arms $t^2$, fulcrumed at $t^3$, so that the roller will normally engage the ink-supply. A type holder or bed $t^4$ is suitably secured to the frame A below the former to carry the desired type at such a height that when the former is lowered it will press the webbing beneath it upon the type. The vibrating arms $t^2$ are retracted by a spring $s^{20}$ and are moved forward by a link $t^5$, connected at one end to the stud 75, which joins the link $a^2$ to the rocker-arm $a'$, said link $t^5$ having its other end provided with a beveled notch $t^6$, which engages a latch $t^7$ on an arm $t^{10}$, secured to the arms $t^2$. When the arm $a'$ is rocked, as has been described, the link $t^5$, in engagement with the vibrating arm $t^{10}$, swings it to carry the ink-roller $t'$ over the face of the type, further movement of the link $t^5$ disengaging its beveled notch $t^6$ from the latch $t^7$. The vibratable arms $t^2$ are thus released and are retracted by the spring $s^{20}$, so that when the former descends it will press the webbing upon the freshly-inked type, and when the link $t^5$ is withdrawn to normal position its notch again engages the latch $t^7$. It will be obvious, however, that any other suitable printing mechanism may be used instead of that herein shown and that it does not form a necessary part of the web-covering apparatus.

Having fully described my invention, what I claim, and desire to secure by Letters Patent, is—

1. In an apparatus of the class described, a "former," a guide to direct the webbing beneath the "former," intermittingly-operated feeding mechanism to move the leading end of a strip of covering material transversely to and under the webbing, means to clamp the "former" upon the webbing and covering material, a strip-severing device, mechanism operating in connection with said former to fold the severed covering material about the webbing, means to render said covering immovable on said webbing, and a webbing-severing device between said latter means and said folding mechanism, substantially as described.

2. In an apparatus of the class described, a "former," convexed on one side to bend the webbing between its longitudinal edges, and feeding, severing, and folding mechanisms to feed a strip of covering material, sever a portion thereof, and fold said severed portion about the webbing and "former," substantially as described.

3. In an apparatus of the class described, webbing-feeding mechanism, means to feed, sever, and fold a portion of covering material around the webbing, a gage to position the cover upon the webbing, and a device to sever the covered portion of webbing, substantially as described.

4. In an apparatus of the class described, a "former," a guide for the webbing extended in the direction of the length of the "former," means to feed, sever, and fold a portion of a strip of covering material about the webbing and the "former," webbing-feeding mechanism, a gage to position the cover upon the webbing, means to sever the webbing, and folding mechanism to fold upon itself the covered and severed portion of webbing, substantially as described.

5. In an apparatus of the class described, a "former," a guide for the webbing extended in the direction of the length of the "former," means to feed, sever, and fold a portion of a strip of covering material about the webbing and the "former," webbing-feeding mechanism, a severing device for the webbing, folding-rolls across which the covered portion of webbing is moved, means to position said folded covering relatively to said rolls, and a coöperating blade to act upon the unsupported side of the severed portion of webbing, to bend the latter and present it to said rolls, to be thereby folded upon itself, substantially as described.

6. In an apparatus of the class described, webbing supplying and feeding mechanism, a webbing-severing device, paper-feeding mechanism, a "former" between said webbing-supplying mechanism and said webbing-severing device to clamp the paper at times, pasting mechanism to apply paste to the paper at one side of the "former," a device to sever a portion of the paper, and folding-blades to engage and overlap one ply of the severed portion upon the other pasted ply and thereby form a flattened tube around the webbing and the "former," substantially as described.

7. In an apparatus of the class described, a "former," a guide for the webbing extended in the direction of the length of the "former," means to feed, sever, and fold a portion of a strip of covering material about the webbing and the "former," webbing-feeding mechanism, folding mechanism to fold the covered webbing, and a webbing-severing device located between said webbing-feeding mechanism and said webbing-folding mechanism, the latter folding upon itself said covered and severed portion of webbing, substantially as described.

8. In an apparatus of the class described, a frame or bed hollowed as at $b^\times$, a convex former, means to move said former to coöperate therewith, webbing-feeding mechanism to feed webbing between said bed and said former, a type-bed mounted on said frame in the path of said webbing, feeding mechanism to feed a covering-strip between said former and hollowed portion, folding mechanism, movement of said former into said hollowed portion printing said web and deflecting the projecting portions of said strip to be folded by said folding mechanism, substantially as described.

9. In an apparatus of the class described, a frame, a bed $b^4$, a carrier $b^5$ movable thereon, a former secured on said carrier and projecting over said frame to coöperate with the latter, a passage for said webbing being provided between said carrier and former, and strip severing and folding mechanisms, substantially as described.

10. In an apparatus of the class described, a web-guide to receive the web and its covering, and two oppositely-movable members to gage the covering on its web, substantially as described.

11. In an apparatus of the class described, a paper-strip-feeding mechanism, a guide, a folding-blade, a projection on said blade, and means to coöperate with said projection to cause said blade to press firmly on the paper in its folding movement, substantially as described.

12. In an apparatus of the class described, a paste-vat, a rock-shaft, a rocker-arm loosely mounted thereon, a paster carried by said arm, a hub and arm fixed on said shaft, and a spring $s$ connecting said arms, and a paste-lifter connected to said fixed arm, combined and operating substantially as described.

In testimony whereof I have signed my name to this specification in the presence of two subscribing witnesses.

WILLIAM C. RAND.

Witnesses:
E. E. VARNUM,
F. R. STOVER.